US012683261B2

(12) United States Patent
Eldaiki et al.

(10) Patent No.: US 12,683,261 B2
(45) Date of Patent: Jul. 14, 2026

(54) FOLDED CIRCULATOR DEVICE WITH COUPLING ELEMENTS AND FLEX CONNECTIONS FOR INTERCONNECTS AND METHODS OF FABRICATING THE CIRCULATOR DEVICE

(71) Applicant: TTM Technologies, Inc., Santa Ana, CA (US)

(72) Inventors: Omar Eldaiki, New York, NY (US); Niels Husted Kirkeby, Jamesville, NY (US)

(73) Assignee: TTM Technologies, Inc., Santa Ana, CA (US)

( * ) Notice: Subject to any disclaimer, the term of this patent is extended or adjusted under 35 U.S.C. 154(b) by 222 days.

(21) Appl. No.: 18/607,121

(22) Filed: Mar. 15, 2024

(65) Prior Publication Data

US 2024/0313380 A1 Sep. 19, 2024

Related U.S. Application Data

(60) Provisional application No. 63/452,736, filed on Mar. 17, 2023.

(51) Int. Cl.
*H01P 1/383* (2006.01)
*H01P 11/00* (2006.01)

(52) U.S. Cl.
CPC .............. *H01P 1/383* (2013.01); *H01P 11/00* (2013.01)

(58) Field of Classification Search
CPC .... H01P 1/387; H01P 1/38; H01P 1/36; H01P 1/383
USPC .................................................. 333/1.1, 24.2
See application file for complete search history.

(56) References Cited

U.S. PATENT DOCUMENTS

| | | | |
|---|---|---|---|
| 3,490,053 | A | 1/1970 | Torao et al. |
| 4,703,289 | A | 10/1987 | Kwitkowski et al. |
| 4,740,762 | A | 4/1988 | Powers et al. |
| 5,898,346 | A | 4/1999 | Kamei et al. |
| 6,107,895 | A | 8/2000 | Butland et al. |
| 6,914,495 | B2 | 7/2005 | Kocharyan |
| 8,040,199 | B2 | 10/2011 | Carr et al. |
| 8,183,952 | B2 | 5/2012 | Bunce |
| 9,136,572 | B2 | 9/2015 | Carr et al. |
| 9,899,717 | B2 | 2/2018 | Bedinger et al. |
| 10,615,476 | B2 | 4/2020 | Kingston et al. |
| 10,847,857 | B2 | 11/2020 | Lynch et al. |
| 2002/0093392 | A1 | 7/2002 | Ohata et al. |
| 2006/0192627 | A1 | 8/2006 | Kocharyan |

(Continued)

FOREIGN PATENT DOCUMENTS

EP 0664573 A1 7/1995

*Primary Examiner* — Stephen E. Jones
(74) *Attorney, Agent, or Firm* — Polsinelli PC

(57) ABSTRACT

A device includes a top ferrite layer and a bottom ferrite layer. The device also includes a first circuit stack between the top ferrite layer and the bottom ferrite layer. The first circuit stack includes a first dielectric layer and a circulator circuit including a first circuit portion on a first side of the first dielectric layer and a second circuit portion on a second side of the first dielectric layer opposite the first side. The first circuit portion is different from the second circuit portion. The device also includes a second circuit stack including a second dielectric layer and a top ground layer disposed over the second dielectric layer. The second circuit stack is disposed over the top ferrite layer.

26 Claims, 8 Drawing Sheets

(56) References Cited

U.S. PATENT DOCUMENTS

| | | | | |
|---|---|---|---|---|
| 2008/0309426 | A1* | 12/2008 | Furuta | H01P 1/387<br>333/24.2 |
| 2013/0321090 | A1 | 12/2013 | Cruickshank et al. | |
| 2021/0175592 | A1* | 6/2021 | Barry | H01P 11/001 |

* cited by examiner

FOLDED CIRCULATOR DEVICE WITH COUPLING ELEMENTS AND FLEX CONNECTIONS FOR INTERCONNECTS AND METHODS OF FABRICATING THE CIRCULATOR DEVICE

CROSS-REFERENCE TO RELATED PATENT APPLICATIONS

This patent application claims the benefit under 35 U.S.C. § 119(e) of U.S. Patent Application Ser. No. 63/452,736, entitled "FOLDED CIRCULATOR DEVICE WITH COUPLING ELEMENTS AND FLEX CONNECTIONS FOR INTERCONNECT AND METHODS OF FABRICATING THE CIRCULATOR DEVICE," filed on Mar. 17, 2023, which is incorporated herein by reference in its entirety.

FIELD

The disclosure is directed to a circulator device and methods for fabricating the circulator device. In particular, the disclosure relates to a circulator including a circulator circuit on two opposite sides of a dielectric layer. Flex connections including the dielectric layer are folded to provide interconnects for the circulator circuit to a mounting surface of the circulator device.

BACKGROUND

A 5th generation (5G) mobile phone network uses beam steering and multiple input and multiple outputs (MIMO) techniques and includes amplifiers for transmitters. Each amplifier is associated with a circulator.

It is desirable to have the circulator as small as possible, both in an x-y plane and in a z-direction perpendicular to the x-y plane. The dimension along the z-direction is referred to as the profile height for the circulators. The conventional circulators are often large, which is due to the need to have a housing strong enough to provide a compression force for assembling ferrites, circuits, and magnet(s) for the circulators. The ferrites are ceramic materials including iron oxide ($Fe_2O_3$) and are soft magnetic. The magnet(s) can be a ceramic or rare-earth magnet and are hard magnetic. The circuits can be any good conductor. Typically, the circuits use copper, bronze, or silver. Circulator constructions may also have a variety of temperature compensation metal plates, steel pole pieces, and housing. The soft-magnetic ferrites are magnetically biased by a static magnetic field that sets the properties of a radio frequency (RF) tensor permeability that ultimately enables the non-reciprocal operation of a device. Often, the circulator is the tallest component in the amplifiers for transmitters on a printed circuit board (PCB). As a result, the circulator affects the size of the overall antenna array. U.S. patent application Ser. No. 17/965,680, entitled "CIRCULATOR DESIGN AND METHODS OF FABRICATING THE CIRCULATOR," filed on Oct. 13, 2021, has addressed the issue with the z-direction and is incorporated herein by reference in its entirety.

The circulator is a passive device including a ferrite core and magnetic bias. The circulator usually comes with three or four ports. When power is injected into port 1, most power exits port 2. When power is injected into port 2, most power exits port 3, and when power is injected into port 3, most power exits port 1. The circulator can be designed with either clockwise (CW) or counter-clockwise (CCW) power flow direction by changing the polarity of the magnetic bias.

The circulator is a non-reciprocal device such that the power flow from port 1 to port 2 does not equal the power flow from port 2 to port 1, which gives circulators a unique characteristic. Circulators are commonly used as isolators to protect the system from unwanted reflected power, caused by a mismatch at the load. Circulators are also widely used on the radio frequency (RF) systems design, such as a duplexer on the front of an antenna to allow transmitting and receiving signals simultaneously.

Conventional circulators may include Y-junction conductors with three arms sandwiched between two-ferrite discs. The Y-junction conductors connect to port connectors. There are flat magnets outside of the ferrite discs. The structure is held together with a metallic housing, which shields the circulators from external magnetic interference and provides mechanical support to the assembly. Additionally, the metallic housing often functions as a magnetic bias return path directing the magnetic flux from one side of the magnet through the ferrite core and back up to the other side of the magnet.

It is known in the art that an operating frequency is inversely proportional to the diameter of the ferrite disc and the square root of the permittivity of the ferrite disc. In conventional circulators, the circuit size is limited by the diameter of the ferrite disc. Either a larger diameter of the ferrite disc or higher permittivity of the ferrite discs can be used to achieve lower frequency.

There remains a need to develop circulators for lower frequency while meeting the challenge of small size requirements.

BRIEF SUMMARY

In one aspect, a circulator device includes a top ferrite layer and a bottom ferrite layer. The device also includes a first circuit stack between the top ferrite layer and the bottom ferrite layer, wherein the first circuit stack includes a first dielectric layer and a circulator circuit including a first circuit portion on a first side of the first dielectric layer and a second circuit portion on a second side of the first dielectric layer opposite the first side, wherein the first circuit portion is different from the second circuit portion. The device also includes a second circuit stack including a second dielectric layer and a top ground layer disposed over the second dielectric layer, wherein the second circuit stack is disposed over the top ferrite layer.

In some aspects, the first circuit stack may include a first plurality of connecting wings configured to be foldable, wherein the second circuit stack includes a second plurality of connecting wings configured to be foldable.

In some aspects, the first plurality of connecting wings may be substantially pie shaped.

In some aspects, the second plurality of connecting wings may be substantially pie shaped.

In some aspects, the first circuit stack may be configured to be folded around the bottom ferrite layer to provide interconnect between the circulator circuit and a mounting surface of the device.

In some aspects, the circulator circuit may connect to the mounting surface by a first plurality of flex connections being connected between one of the first circuit portion or the second circuit portion including Y-junction conductors and the first plurality of connecting wings.

In some aspects, the second plurality of connecting wings may be configured to be folded around the bottom ferrite layer to connect to a bottom ground layer on the mounting surface.

In some aspects, the top ground layer may connect to the bottom ground layer by a second plurality of flex connections being connected to the second plurality of connecting wings.

In some aspects, the first circuit stack may include mounting pads and a middle ground layer over the first side of the first dielectric layer. The mounting pads and a portion of the middle ground layer may be electrically isolated and positioned on the first plurality of connecting wings.

In some aspects, the device may have a bottom surface including a first plurality of folded connecting wings alternately positioned with a second plurality of folded connecting wings, the bottom surface including the mounting pads and the portion of the middle ground layer.

In some aspects, the device may include a magnet over the top ferrite layer for providing magnetic bias.

In some aspects, at least one of the first circuit portion and the second circuit portion may include one or more shunt capacitors configured to tune the device to a reduced frequency of operation.

In some aspects, the reduced frequency of operation may be in a range from 2300 MHz to 2700 MHZ.

In some aspects, the device may include three or more ports. One or more ports may be coupled to the first circuit portion and the second circuit portion.

In some aspects, at least one of the first circuit portion and the second circuit portion may include a resistive element configured to terminate at least one of the three or more ports of the device to form an isolator.

In some aspects, the first dielectric layer and the bottom ferrite layer may be side metallized to provide signal paths for the circulator circuit to a mounting surface.

In some aspects, the first and second dielectric layers and the top and bottom ferrite layers may be side metallized to provide electrical paths for the top ground layer to a bottom ground layer at a bottom of the device.

In some aspects, a method for fabricating a circulator device is provided. The method may include forming a first circuit stack including a first circuit portion of a circulator circuit on a first side of a first dielectric layer and a second circuit portion of the circulator circuit on a second side of the first dielectric layer opposite to the first side, wherein the second circuit portion is different from the first circuit portion, the first circuit stack including a first plurality of connecting wing configured to be foldable. The method may also include forming a second circuit stack including a second dielectric layer and a top ground layer disposed over the second dielectric layer, the second circuit stack including a second plurality of connecting wing configured to be foldable. The method may include forming a device stack including a bottom ferrite layer, the first circuit stack disposed over the bottom ferrite layer, a top ferrite layer disposed over the first circuit stack, and the second circuit stack disposed over the top ferrite layer. The method may include folding the first plurality of connecting wings of the first circuit stack to a bottom of the bottom ferrite layer. The method may include folding the second plurality of connecting wings of the second circuit stack to the bottom of the bottom ferrite layer to form the circulator device having a bottom surface.

In some aspects, the method may include attaching a magnet to the top ground layer by adhesive.

In some aspects, the first and second dielectric layers may include one of polymer, fiber-reinforced polymer, or ceramic material.

In some aspects, one of the first circuit portion and the second circuit portion may include Y-junction conductors. The first circuit stack may include a middle ground layer and mounting pads on a same side as the at least one of the first circuit portion and the second circuit portion. Another one of the first circuit portion and the second circuit portion may include tuning elements including a shunt capacitor configured to tune the circulator device to a reduced frequency.

In some aspects, the top and middle ground layers and the circulator circuit may include a metal selected from one or more of gold, silver, copper, aluminum, or tin.

In some aspects, the bottom surface may include a first plurality of folded connecting wings alternately positioned with a second plurality of folded connecting wings, the bottom surface including the mounting pads and the portion of the middle ground layer.

In a further aspect, a method for fabricating a circulator device is provided. The method may include forming a first circuit stack including a first circuit portion of a circulator circuit on a first side of a first dielectric layer and a second circuit portion of the circulator circuit on a second side of the first dielectric layer opposite to the first side, wherein the second circuit portion is different from the first circuit portion. The method may include forming a second circuit stack including a second dielectric layer and a top ground layer disposed over the second dielectric layer. The method may include plating a first edge portion of a bottom ferrite layer to provide signal paths from the first circuit portion and the second circuit portion to a mounting surface of the circulator device. The method may include forming a device stack including a bottom ferrite layer, the first circuit stack disposed over the bottom ferrite layer, a top ferrite layer disposed over the first circuit stack, and the second circuit stack disposed over the top ferrite layer.

In some aspects, the method may include plating an edge portion of the top ferrite layer and a second edge portion of the bottom ferrite layer to provide an electrical path from the top ground layer or a middle ground layer to a bottom ground layer.

In some variations, forming the circulator circuit on the first and/or second dielectric layer may include forming a resistive element using any method compatible with the dielectric used. This may include thin film methods, thick film methods, direct print methods, or using a dielectric with a prefabricated resistive layer, such as Ohmega Ply™ or Ticer™.

In some variations, the resistive termination element created is substantially the system impedance, typically 50 Ohm. In other variations, the resistive termination element is substantially the impedance of the circulator resonator, typically in the range of 6 Ohm to 12 Ohm. In other variations, the resistive element is in the range from 0 to 200 Ohm. In other variations, there is a plurality of resistive elements combined to make one or more resistive termination elements.

Additional aspects and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1:
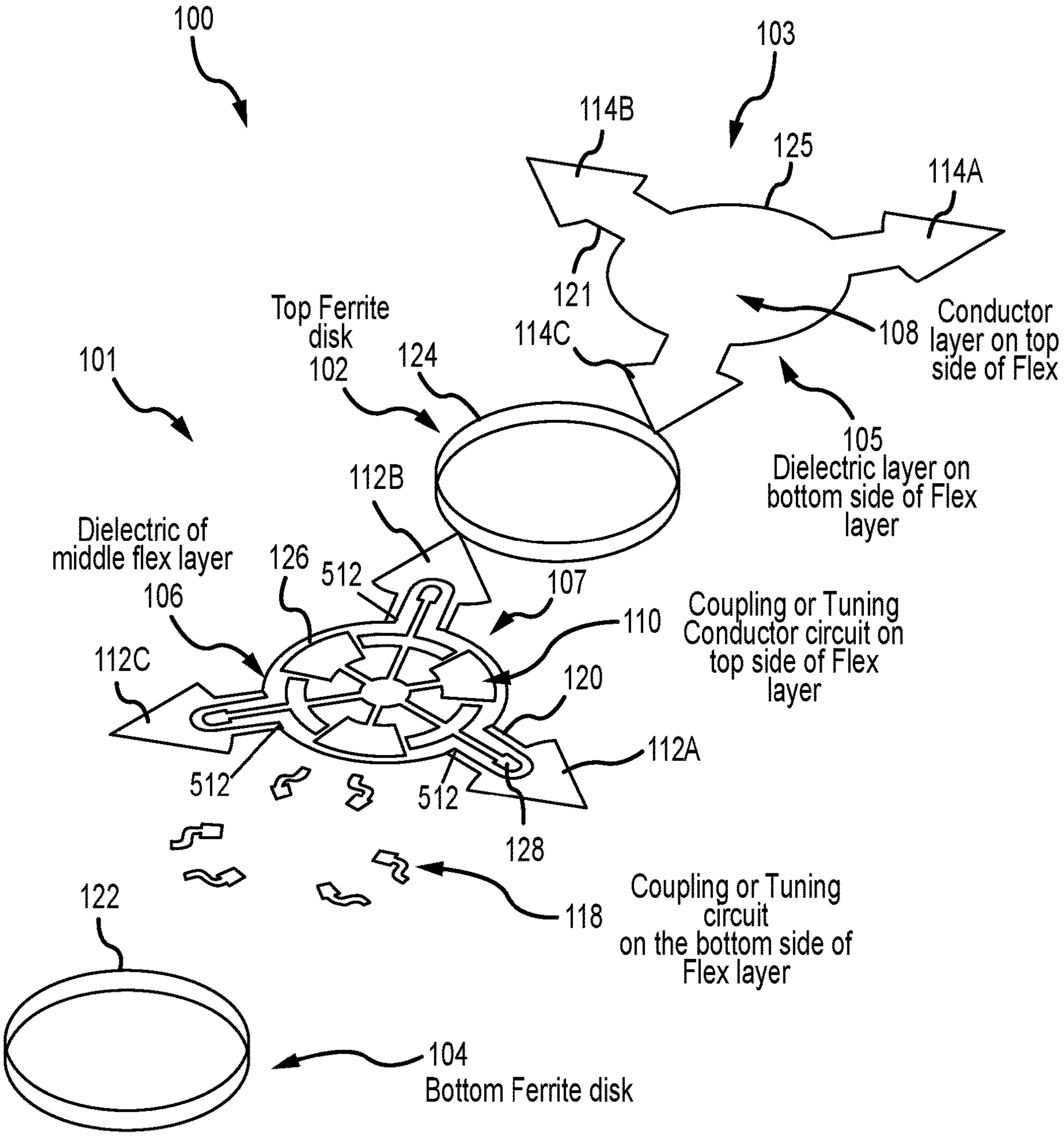
FIG. 1 is an exploded view of a circulator device prior to assembling according to one aspect of the disclosure.

The disclosure may be understood by reference to the following detailed description, taken in conjunction with the drawings as described below. It is noted that, for purposes of illustrative clarity, certain elements in various drawings may not be drawn to scale.

Conventional circulators allow a limited area determined by diameters of the ferrite discs to realize Y-junction conductors and a matching circuitry. Modern applications seek to shrink in size and therefore push for small circulators. As the circulator size shrinks, there is a reduced area within the diameters of the ferrites for realizing the Y-junction conductors and matching circuitry, such that the circulator becomes increasingly narrowband to the point where the circulator can no longer perform in the applications. When the target frequency is reduced, a circulator would need to add additional circuitry elements to achieve the reduced frequency. However, small sized circulators do not have the space to fit the additional circuitry elements.

A few types of conventional circulators have some disadvantages. A first type of conventional circulator is a packaged circulator with Y-junction conductors made of a single sheet of metal, with the leads bent down to connect to a mounting surface, such as disclosed in U.S. Pat. No. 10,615,476, entitled "Method of manufacturing a microstrip circulator," by James P. Kingston, Jose Gil, and David E. Barry, issued on Apr. 7, 2020. The disadvantage of this first type of conventional circulator is that the Y-junction circuit is made of a single sheet of metal connecting to three ports and thus only the areas within the diameters of the ferrites are usable for circuit elements. Additionally, there is no access to ground potentials to couple the Y-junction circuit, since there are only connections to the three ports. Other disadvantages of the first type of conventional circulator are easily breakable leads and that it is challenging to bend and align the Y-junction circuit accurately and repeatably.

The second type of conventional circulator is designed to be mounted on a printed circuit board (PCB), as disclosed in U.S. Pat. No. 6,914,495, entitled "Surface mountable circulator/isolator and assembly technique," by Karen N. Kocharyan, issued on Jul. 5, 2005. The second type of conventional circulator includes vias to connect to a mounting surface. The disadvantage of this second type of conventional circulator is that an added PCB layer at the bottom of the circulator may add loss to an overall loss of the device and may also add cost. Also, high impedance discontinuity caused by the vias that connect to the mounting surface may be difficult to match.

The third type of conventional circulator is fabricated using PCB material, as disclosed in U.S. Pat. No. 8,183,952, entitled "Surface Mountable Circulator," by Graeme Bunce and Thomas Lingel, issued on May 22, 2012. The third type of conventional circulator includes a core circuit sandwiched between the top and bottom dielectric layers, which includes an opening for disposal of a ferrite disc and aligns the ferrite disc with the core circuit. The core circuit contains the same conductor arrangement on both sides of the dielectric layer. A via connection is used to connect the core circuit on both sides of the dielectric layer to the mounting surface at the bottom of the circulator. The disadvantage of the third type of conventional circulator is the manufacturing complexity involved in precision forming of the opening for the ferrite discs and precision forming of the vias for the interconnects. The disadvantage also includes additional cost added by the plurality of dielectric layers. Also, high impedance discontinuity can be challenging to match at high frequencies.

All above-mentioned conventional circulators use either one surface for the Y-junction conductors or circuit or when the conventional circulators use two surfaces for the conductor circuit, both surfaces have the same circuits.

The disclosure provides a circulator circuit that solves the problems of the size and complexity of the conventional circulators involving the conductor circuit and interconnects to the mounting pads of the circulator. The disclosed circulator device includes a circulator circuit formed on both sides of a dielectric layer. The disclosed circulator device utilizes a first side (e.g., top side) of a dielectric layer to include a first circuit portion, such as Y-junction conductors or circuit and/or a resistive element. The disclosed circulator device utilizes a second side (e.g., backside) of the dielectric layer to add coupling elements or coupling circuits for tuning the circulator. As such, the effective circuitry area of the circulator device is doubled. The first portion of the circulator circuit on the top side and the second portion of the circulator circuit on the bottom side are different.

The disclosed circulator device also offers additional flexibility in that ground potential is accessible to allow for coupling, e.g., capacitive coupling, to the ground, and impedances of ports and resonators can be controlled.

In some variations, the additional coupling circuits may include shunt capacitors disposed on the backside of the dielectric layer at the terminals of the Y-junction conductors. These shunt capacitors can be used to tune the circulator to a lower frequency. When the thickness of the dielectric layer is selected to be very thin, for example, 25.4 μm or 12.7 μm, a high capacitance can be obtained in a very limited space.

The dielectric layer may be flexible enough to be foldable. Flex connections are used to provide interconnects for the circulator circuit to a mounting surface at a bottom of the circulator.

The disclosed circulators have several benefits over conventional circulators. For example, the disclosed circulator device can achieve a lower frequency of operation without the need to increase the size of the circulator device. The disclosed circulator device also eliminates the need for metalizing the ground side of the ferrite discs which are commonly used for conventional circulators. The disclosed circulator device also eliminates the need for vias, sidewall metallization, and connection pins that are commonly used in conventional circulators. The disclosed circulator can be configured to be an isolator device by terminating one of the ports of the circulator with a proper matching load. The disclosed isolator device provides great space efficiency as the termination is built inside the isolator and does not take extra space outside the isolator.

FIG. 1 is an exploded view of a circulator device prior to assembling according to one aspect of the disclosure. As shown in FIG. 1, circulator device 100 includes a top ferrite element, ferrite layer, or ferrite disc 102, a bottom ferrite element, ferrite layer, or ferrite disc, a top circuit stack 103, and a middle circuit stack 101.

The top circuit stack 103 includes a top dielectric layer 105 that is disposed over or laminated to the top ferrite disc 102. The top circuit stack 103 also includes a central portion 108 of a conductor layer on the top side of the top dielectric layer 105. The central portion 108 of the conductor layer has a circular shape and an outer edge 125, which matches with the diameters of the ferrite discs 102 and 104. The central portion 108 forms a top ground layer or ground plane 108. In the disclosure, the central portion and the top ground layer or top ground plane are used interchangeably.

The top circuit stack 103 also includes a central circular portion and three connecting wings 114A-C, each connecting wing including a portion of the conductor layer on top of the same top dielectric layer, which extends from the central circulator portion. The connecting wings 112A-C can be folded to connect the top ground plane 108 on the top side to a bottom ground plane under a bottom of the circulator device 100. It will be appreciated by those skilled in the art that the number of wings may vary with the design of the circulator. For example, if the circulator has four ports, there will be four wings.

Middle circuit stack 101 is inserted between the top ferrite disc 102 and the bottom ferrite disc 104. Middle circuit stack 101 includes a middle dielectric layer 106 having a circular shape with edge 126. Middle circuit stack 101 also includes circulator circuit 107 placed on both sides of the middle dielectric layer 106. The circulator circuit 107 includes a first circuit portion 110 on the top side of the middle dielectric layer 106. The first circuit portion may be the main circuit or conductor circuit formed on the top side. In the disclosure, the first circuit portion, the main circuit or conductor circuit are used interchangeably. The main circuit or conductor circuit 110 can be formed of one or more metals, such as gold, silver, copper, aluminum, or tin, or a combination of metals such as copper with tin plating, or copper with silver plating, among others. The first circuit portion 110 is also referred to as top coupling circuit 110. The main circuit 110 includes Y-junction conductors, unconnected circuitry, circuitry connected to the ground, and circuitry connected to ports.

The circulator circuit 107 also includes a second circuit portion 118 on the bottom side or backside of dielectric layer 106, e.g., the bottom coupling circuit 118. The second circuit portion 118 is also referred to as bottom coupling circuit 118 or bottom coupling elements. The bottom coupling circuit 118 may include coupling elements, such as shunt capacitors, which can be used to tune the circulator device 100 to operate at a lower frequency.

The top and bottom coupling circuits 110 and 118 can be different from each other. For example, the bottom coupling circuit 118 is different from the main circuit 110. The bottom coupling circuit 118 can help achieve the desired performance and operation frequency without the need to increase the ferrite disc size.

Middle circuit stack 101 also includes three connecting wings 112A-C connected to the coupling conductor circuit 110 by respective connecting portions 120. The connecting wings 112A-C can be folded to connect both the coupling conductor circuit 110 and the coupling conductor circuit 118 on both the top and bottom sides of the middle dielectric layer 106 to create a mounting surface 304 of the circulator device 100.

To fully utilize the area of the ferrite, main circuit 110 can have features (e.g., port matching stubs or resonator stubs) as close to the edge of the ferrite disc as possible. However, as the circulator circuit 107 including main circuit 110 and coupling circuit 118 approaches the edges 124 and 122 of the top and bottom ferrite discs 102 and 104 when assembled, the effective dielectric constant changes dramatically due to proximity to air. Thus, the closer the circulator circuit 107 is toward the edges 124 and 122 of the top and bottom ferrite discs 102 and 104, the accuracy of the placement of the main circuit 110 relative to the ferrite discs becomes more critical for the performance of the circulator.

Figure 2:
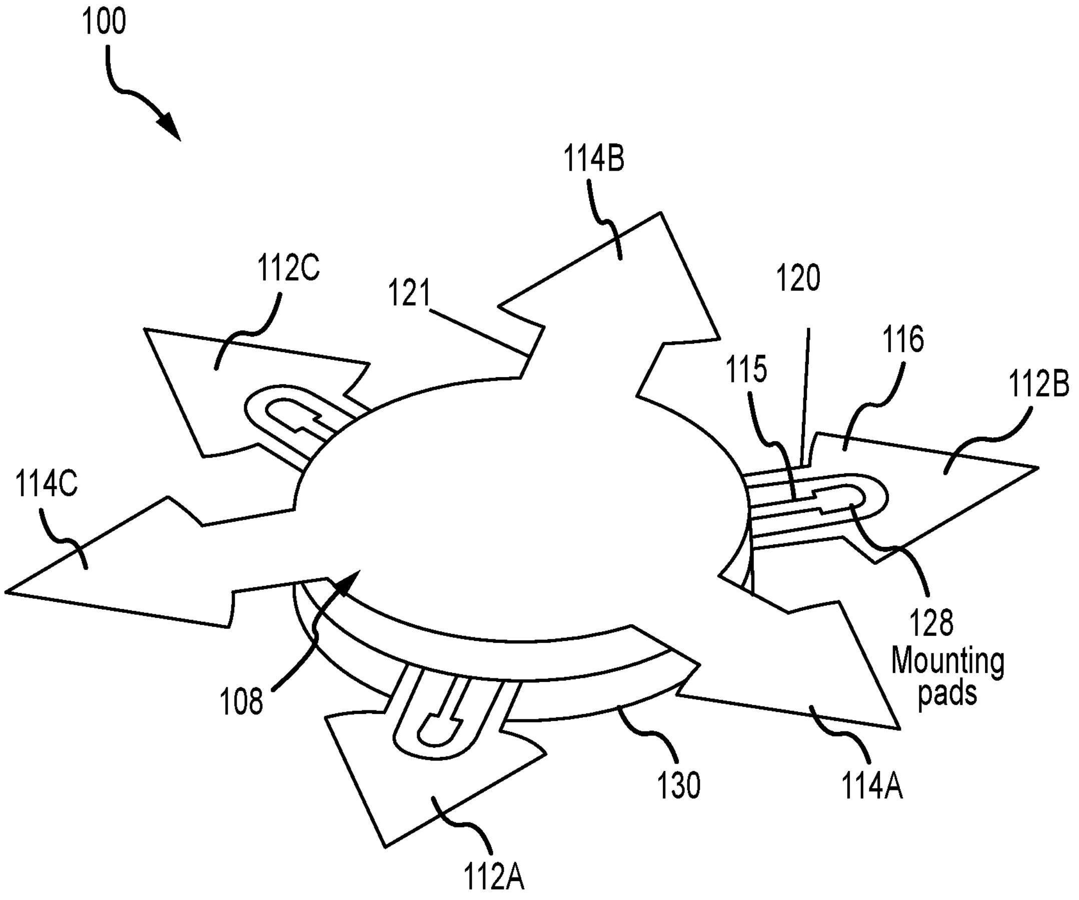
FIG. 2 is a condensed view of the circulator device of FIG. 1 according to one aspect of the disclosure.

A condensed view of the circulator device in FIG. 1 according to one aspect of the disclosure is depicted in FIG. 2. As shown in FIG. 2, the top circuit 103, the top ferrite disc 102, the middle circuit stack 101, and the bottom ferrite disc 104 are placed together. The top ferrite disc 102 may have the same diameter as the bottom ferrite disc 104. Edge 124 of the top ferrite disc 102 is aligned with edge 122 of the bottom ferrite disc 104. Edge 125 of the top ground plane 108 is aligned with edge 124 of the top ferrite disc 102. Edge 126 of the middle dielectric layer 106 is aligned with edge 124 of the top ferrite disc 102 and edge 122 of the bottom ferrite disc 104.

It will be appreciated by those skilled in the art that the wings may have any shape as long as they fit together. When the wings are all folded together, the wings would substantially fill the area below the ferrite disc. For example, the wings may be oddly shaped as long as they fit together.

The middle circuit stack 101 includes connecting wings 112A-C connected to a central circular portion by respective connecting portions 120. The top circuit stack 103 includes connecting wings 114A-C connected to the central circular portion 108 by respective connecting portions or flex connections 121. The connecting portions or flex connections 120 are configured to have the length extending to the bottom of the bottom ferrite disc 104, for example, the length is equal to or slightly larger than the combined thickness of the top ferrite disc 102 and the bottom ferrite disc 104.

Also, a middle ground 116 and mounting pads 128 are formed on the top side of the middle dielectric layer 106. The mounting pads 128 are physically separated and electrically isolated from the middle ground 116 by a dielectric portion 115. A portion of the middle ground 116 and mounting pads 128 are positioned on the connecting wings 112A-C.

Figure 3A:
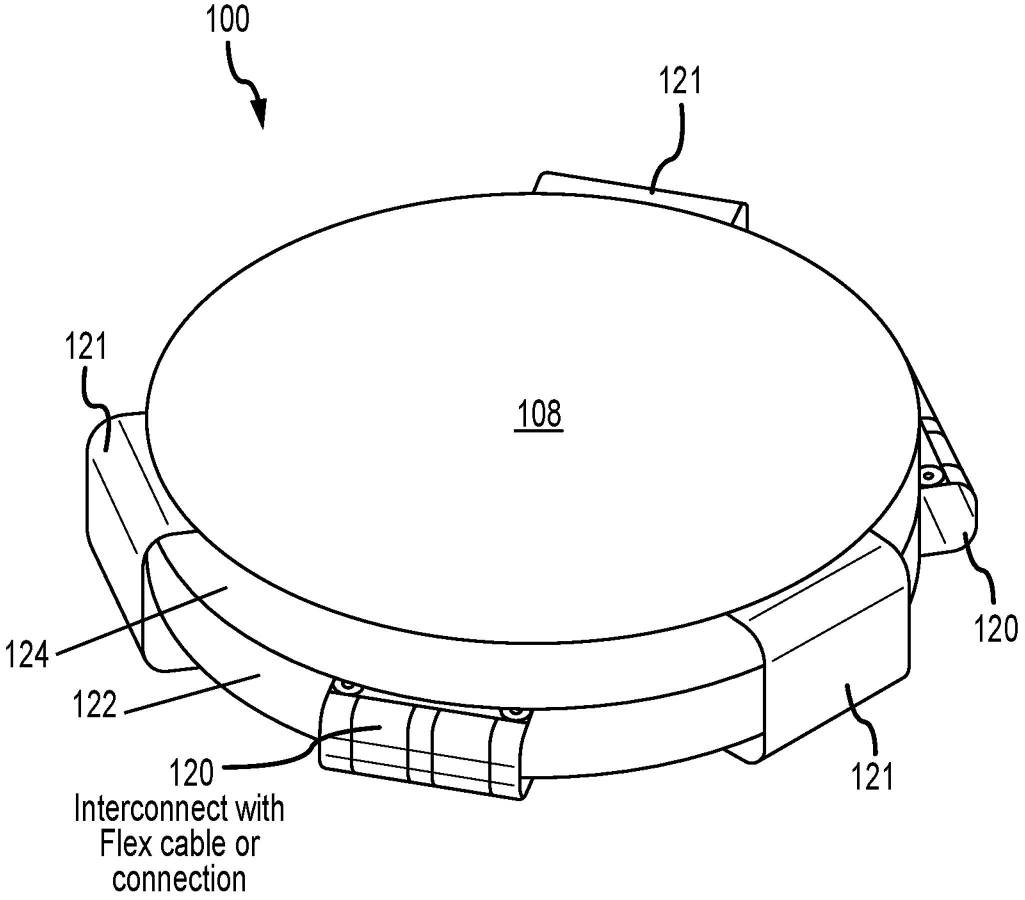
FIG. 3A is a top view of the circulator device of FIG. 1 according to one aspect of the disclosure.
Figure 3B:
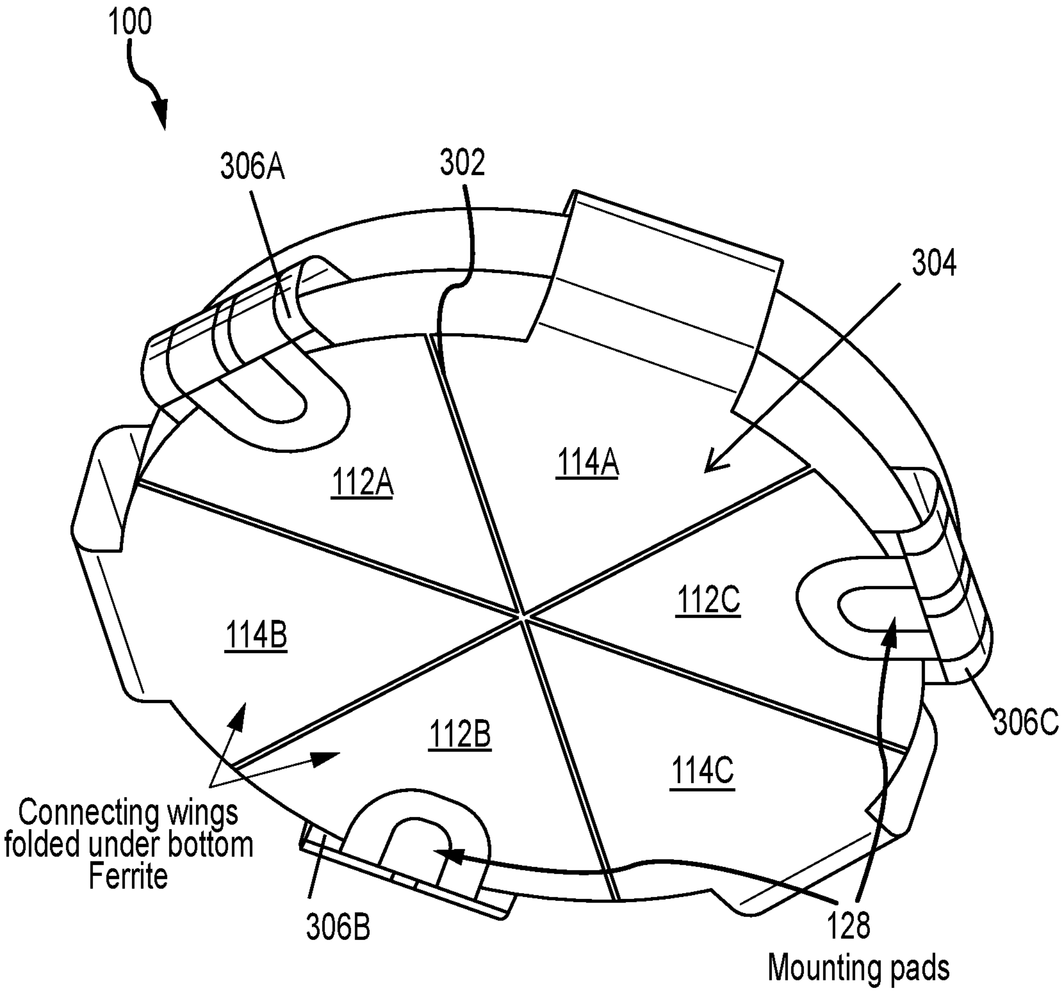
FIG. 3B is a bottom view of the circulator device of FIG. 3A according to one aspect of the disclosure.

FIG. 3A is a top view of the circulator device of FIG. 1 according to one aspect of the disclosure. FIG. 3B is a bottom view of the circulator device of FIG. 3A according to one aspect of the disclosure. As shown in FIG. 3A, the circulator device 100 is fully assembled. The dielectric layers 106 and 105 may be flexible. The circulator device 100 can be formed by folding connecting wings 112A-C and 114A-C of both middle and top circuit stacks 101 and 103 including middle and top dielectric layers, respectively. The connecting wings 112A-C of the middle circuit stack 101 and connecting wings 114A-C of the top circuit stack 103 including respective dielectric layers 106 and 105 can be folded under the bottom ferrite disc 104 to provide vertical connections for the circulator circuit 107 including Y-junction conductors and the ground, respectively. The top circulator circuit 107 including the top coupling circuit 110 and the bottom coupling circuit 118 connects to a mounting surface of the circulator by flex connection 120. Also, circulator device 100 includes the top ground layer 108 on top of the top dielectric layer 105. The top ground layer 108 connects to a bottom ground layer (not shown) of the circulator device by flex connections 121.

In some variations, the flex circuits may be glued to the ferrites.

In other variations, in the case of thermal plastic dielectrics, the flexible circuits can be heated and pressed to the ferrites. Heating and pressing the ferrites and the thermal plastic dielectric can create a laminate where the thermal plastic dielectric bonds with the two ferrites and thus holds the ferrites together.

As shown in FIG. 3B, the connecting wings 112A-C from the middle circuit stack 101 and the connecting wings 114A-C from the top circuit stack 103 are shaped to form a circular shape by a combination of the connecting wings 112A-C with connecting wings 114A-C. Each of connecting wings 112A-C from the middle circuit stack 101 is alternately placed between two connecting wings 114A-C from the top circuit stack 103. There are no overlaps between the neighboring connecting wings, but small gaps 302 between the neighboring connecting wings.

Figure 5A:
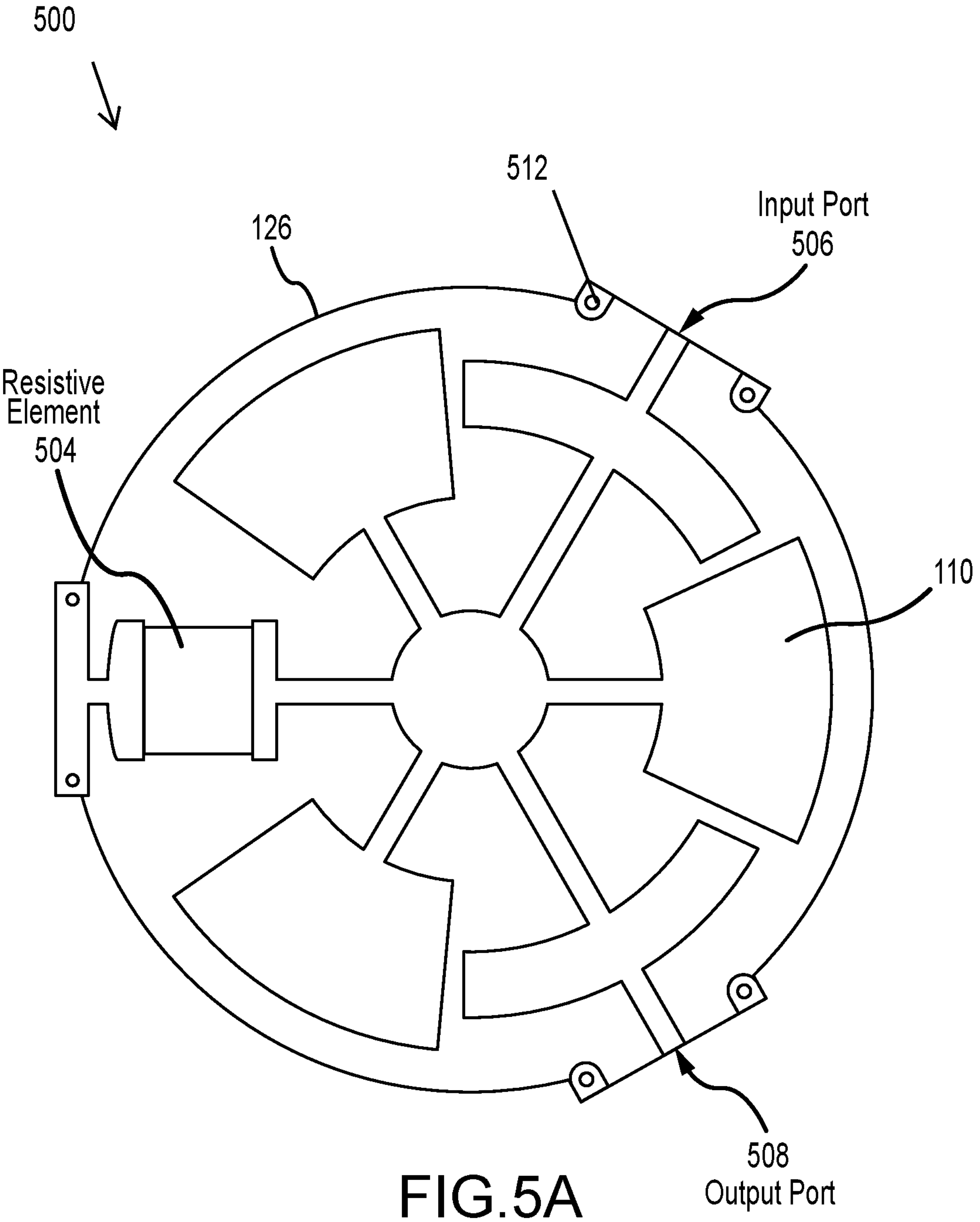
FIG. 5A is a top view of a first portion of the circulator circuit on the top side of the middle dielectric layer of FIG. 1 according to one aspect of the disclosure.
Figure 5B:
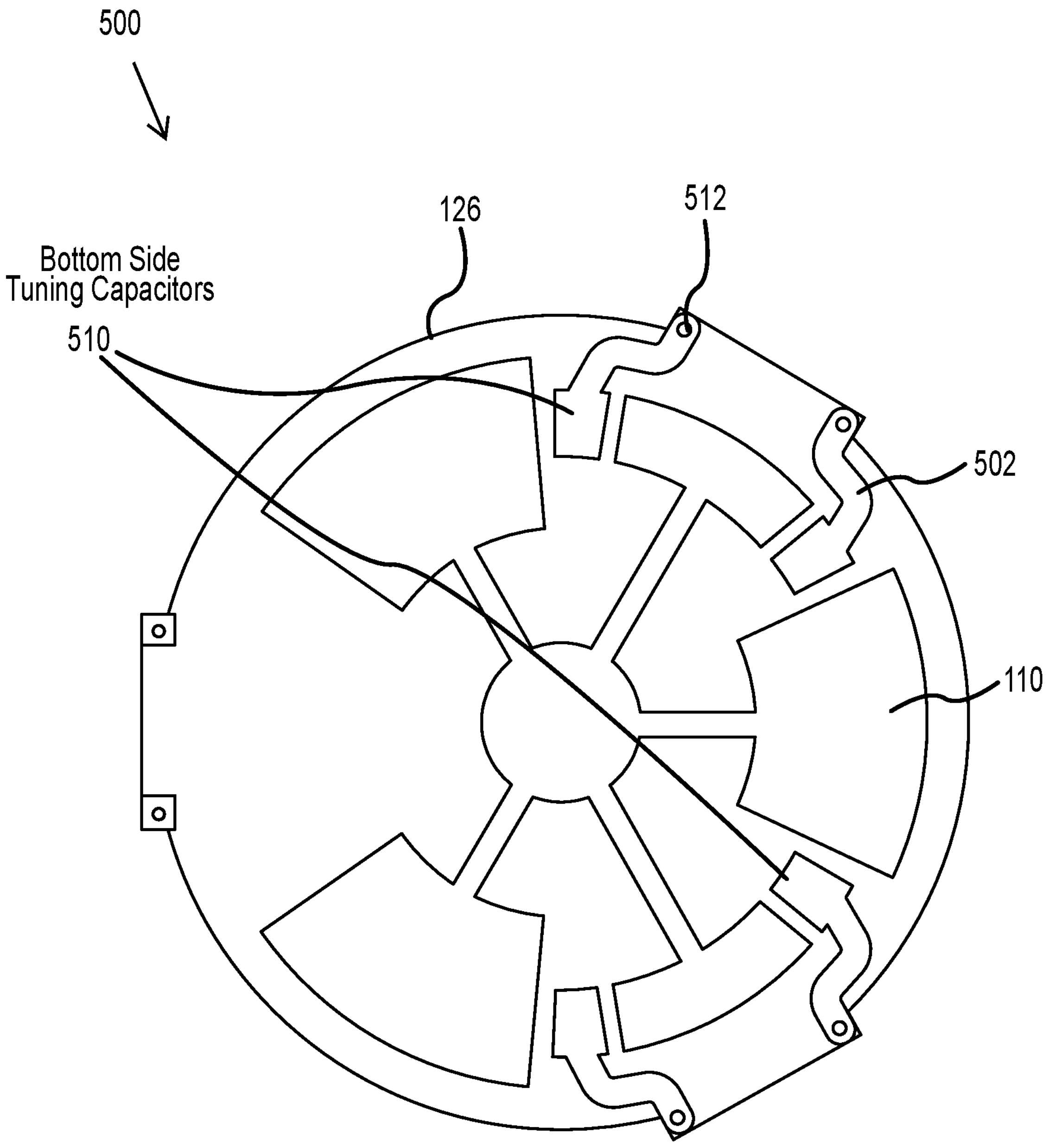
FIG. 5B is a bottom view of a second portion of the circulator circuit on the bottom side of the middle dielectric layer of FIG. 1 according to one aspect of the disclosure.

Circulator device 100 also includes mounting pads 128 and middle grounds 116 on top of the middle dielectric layer 106. The middle grounds or middle ground layers 116 and mounting pads 128 are formed on the same dielectric layer 106 as the main circuit 110 including Y-junction conductors. The mounting pads and a portion of the middle ground 116 are positioned on the connecting wings 112A-C. Both mounting pads 128 and middle grounds 116 are also folded under the bottom ferrite disc 104 to create a bottom surface or a mounting surface 304 that includes mounting pads and middle ground 116 on folded connecting wings 112A-C and top ground 108 on folded connecting wings 114A-C. A folded connection 306 connects the bottom ground to the top of the middle dielectric layer 106 and then provides ground connection through vias 512 for the bottom coupling circuit 118. The vias 512 are illustrated in FIG. 1 and FIGS. 5A-5B. As such, the top ground and middle ground at the bottom surface 304 can connect to a bottom ground of the circulator device. The mounting pads that are connected to the Y-junction conductors as shown in FIG. 1 are also on the bottom surface, which can be placed on a mounting surface. The flexibility of the dielectric layers 106 and 105 allows the folding of the circulator circuit and top ground layer to eliminate the need for vias, sidewall metallization, and connection pins that are commonly used for vertical connections or interconnections of conventional circulators.

Figure 4:
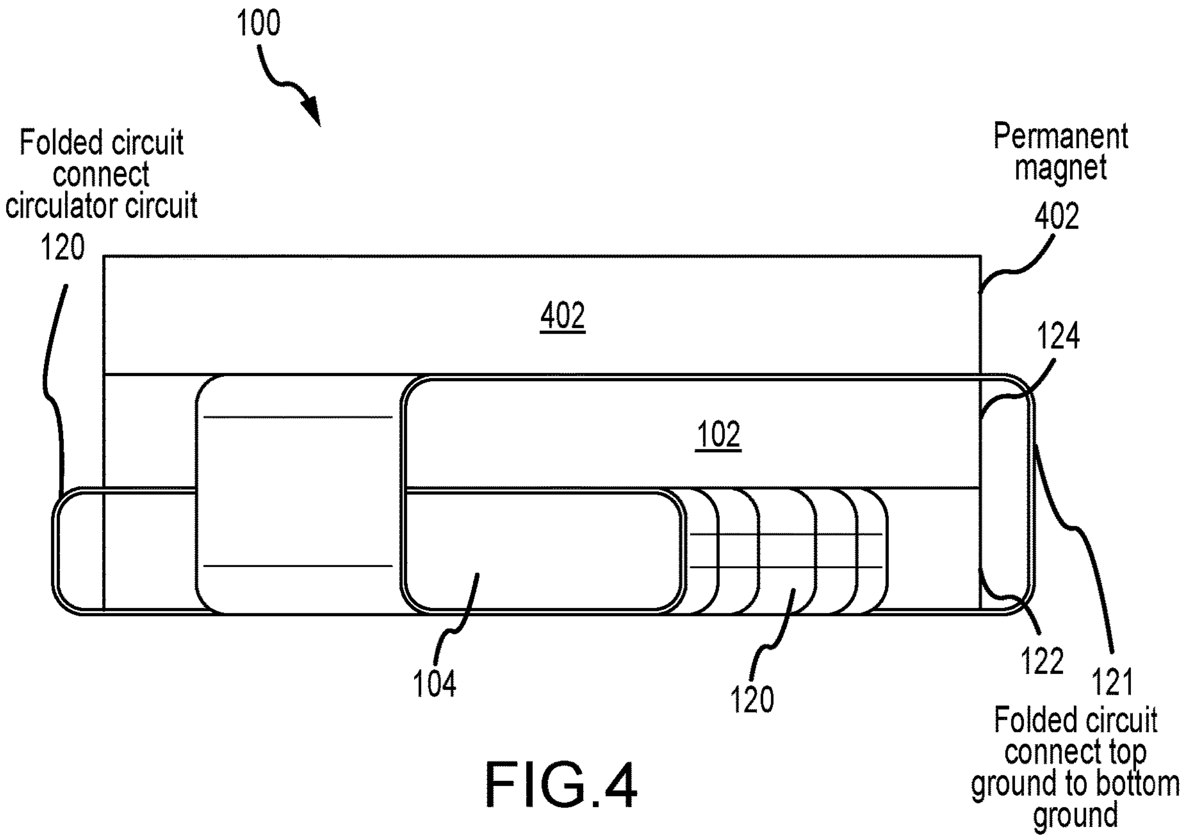
FIG. 4 is a side view of the circulator device of FIGS. 3A and 3B according to one aspect of the disclosure.

A side view of the circulator device of FIGS. 3A and 3B according to one aspect of the disclosure is depicted in FIG. 4. As shown in FIG. 4, the connecting wings 114A-C of the top circuit stack 103 can be folded to connect the top ground plane 108 to a bottom ground plane under the bottom ferrite disc 104 by flex connections, which extend vertically outside the edge 124 of the top ferrite disc 102 and the edge 122 of the bottom ferrite disc 104.

A flat permanent magnet 402 is disposed over the top ground layer or top ground plane 108, which is disposed over the top ferrite disc 102. The magnet 402 serves as a direct current (DC) magnetic bias source. The magnet 402 may be glued to the central portion 108 or the top ground plane 108. Thus, magnet 402 does not have electrical contact with the top ground plane 108.

In some variations, there may be a soft-magnetic (e.g., ferrous metal) disc and/or a non-magnetic spacer disc between the magnet 402 and the top ground plane 108.

In some variations, magnet 402 may be ceramic magnets or rare earth metal magnets.

The connecting wings 112A-C of the middle circuit stack 101 can be folded such that connecting portions or flex connections 120 extend vertically outside the edge 122 of the bottom ferrite disc 104 and the mounting pads 128 are positioned under the bottom of the bottom ferrite disc 104 after folding, as shown in FIG. 3B. The mounting pads can be positioned on a mounting surface 304 of the circulator. The mounting surface includes the folded connecting wings 112A-C which are alternately positioned with the folded connecting wings 114A-C. The connecting portions 120, rather than vias, connect the circulator circuit 107 to the mounting surface 304 of the circulator.

Isolator

In some variations, the top coupling circuit 110 may include a resistive element when the circulator is configured to be an isolator.

The isolator is a two-port device, which is often a three-port or four-port circulator with one or two ports terminated with a resistive element, such that unwanted incoming power on an output port (e.g., reflections) is directed to the resistive element and then dissipated as heat.

The isolator can be formed by terminating one of the ports of the circulator with a proper matching load. The termination is built inside the circulator device. The termination can be built on either the top or bottom sides of the middle dielectric layer.

In some variations, the matching load can be realized as a resistive layer or resistive element on either surface of the dielectric layer. The resistive element can be designed to terminate one of the circulator ports and thus turn the circulator into an isolator.

Since the resistive element is built inside the circulator device, the design of the disclosed circulator offers a great saving on space and does not take extra space outside the circulator device.

A top view of the first portion of the circulator circuit on the top side of the middle dielectric layer of FIG. 1 according to one aspect of the disclosure is depicted in FIG. 5A. As shown in FIG. 5A, an isolator 500 includes an input port 506 and an output port 508 and a resistive element 504 that terminates one of the three ports and turns the circulator into the isolator. The isolator 500 includes a top coupling circuit 110 on the top side of the middle dielectric layer 106. The top coupling circuit 110 includes Y-junction conductors. Also, the input port 506 and the output port 508 are positioned near edge 126 of the middle dielectric layer 106, as shown in FIG. 5A. Also, the top coupling circuit 110 includes circuit Y-junction conductors.

A bottom view of the second portion of the circulator circuit on the bottom side of the middle dielectric layer of FIG. 1 according to one aspect of the disclosure is depicted in FIG. 5B. As shown in FIG. 5B, the isolator 500 includes the bottom coupling circuit 118 on the bottom side of the middle dielectric layer 106, which may include two shunt capacitors or tuning capacitors 510 positioned under the input port 506 and output port 508, respectively. The capacitors 510 can be connected to vias 512 through connections 502. The first circuit portion or top coupling circuit 110 connects to the second circuit portion or the bottom coupling circuit 118 through folded connections 306A-C (shown in FIG. 3B) and vias 512 in the middle dielectric layer 106. For example, the folded connections 306A-C connect the middle grounds 112A-C (that are folded to be under the bottom of the bottom ferrite) to the top of the middle dielectric layer 106. Ground connections for tuning capacitors 510 are provided through vias 512. Specifically, vias 512 connect the tuning capacitors 510 on the bottom of the middle dielectric layer 106 to the top of the middle dielectric layer 106. The vias 512 connect to the middle grounds through the folded connections.

It will be appreciated by those skilled in the art that the number of shunt capacitors may vary with the type of circulators depending on the number of ports.

In some variations, the circulator may include three ports and is configured to be an isolator. The top coupling circuit may include a resistive element and Y-junction conductors. The bottom coupling circuit may include two shunt capacitors positioned under the input port and output port, respectively.

In other variations, the circulator may include three ports and is configured to be an isolator. The top coupling circuit may include two shunt capacitors positioned under the input port and output port, respectively (not shown). The bottom coupling circuit may include a resistive element and Y-junction conductors (not shown).

In some variations, the circulator includes three ports and is not configured to be an isolator. The top coupling circuit may include Y-junction conductors. Three mounting pads are on the same side as the Y-junction conductors. The bottom coupling circuit may include one, two, or three shunt capacitors positioned to be under the mounting pads.

In some variations, the circulator includes three ports and is not configured to be an isolator. The bottom coupling circuit may include Y-junction conductors. Three mounting pads are on the same side as the Y-junction conductors. The top coupling circuit may include one, two, or three shunt capacitors positioned to be under the mounting pads.

In some variations, the circulator includes four ports and is not configured to be an isolator. The top coupling circuit may include Y-junction conductors. Four mounting pads are on the same side as the Y-junction conductors. The bottom coupling circuit may include one, two, three, or four shunt capacitors positioned to be under the mounting pads.

In some variations, the circulator includes four ports and is not configured to be an isolator. The bottom coupling circuit may include Y-junction conductors. Four mounting pads are on the same side as the Y-junction conductors. The top coupling circuit may include one, two, three, or four shunt capacitors positioned to be under the mounting pads.

In other variations, the circulator may include four ports and is configured to be an isolator. The top coupling circuit may include a resistive element and Y-junction conductors. The bottom coupling circuit may include three shunt capacitors positioned aligned with three mounting pads.

In some variations, the top and middle dielectric layers 105 and 106 can be formed of, but not limited to, a polymer such as a polyimide, polytetrafluoroethylene (PTFE), a fiber-reinforced polymer, such as epoxy glass re-enforced material, or ceramic materials, among others.

The disclosed folded circulator device is quite different from the circulator by Bunce's circulator (see U.S. Pat. No. 8,183,952, entitled "Surface Mountable Circulator," by Graeme Bunce et al., issued on May 22, 2012). Bunce's circulator uses Y-conductor arms extended to an edge via for interconnects. Bunce's circulator uses vias for interconnects rather than using the disclosed flex connections 120 and 121 to serve as interconnects. Also, Bunce's circulator does not use the backside for coupling elements. Moreover, Bunce's circulator does not contain any resistive elements.

Fabrication

Figure 6:
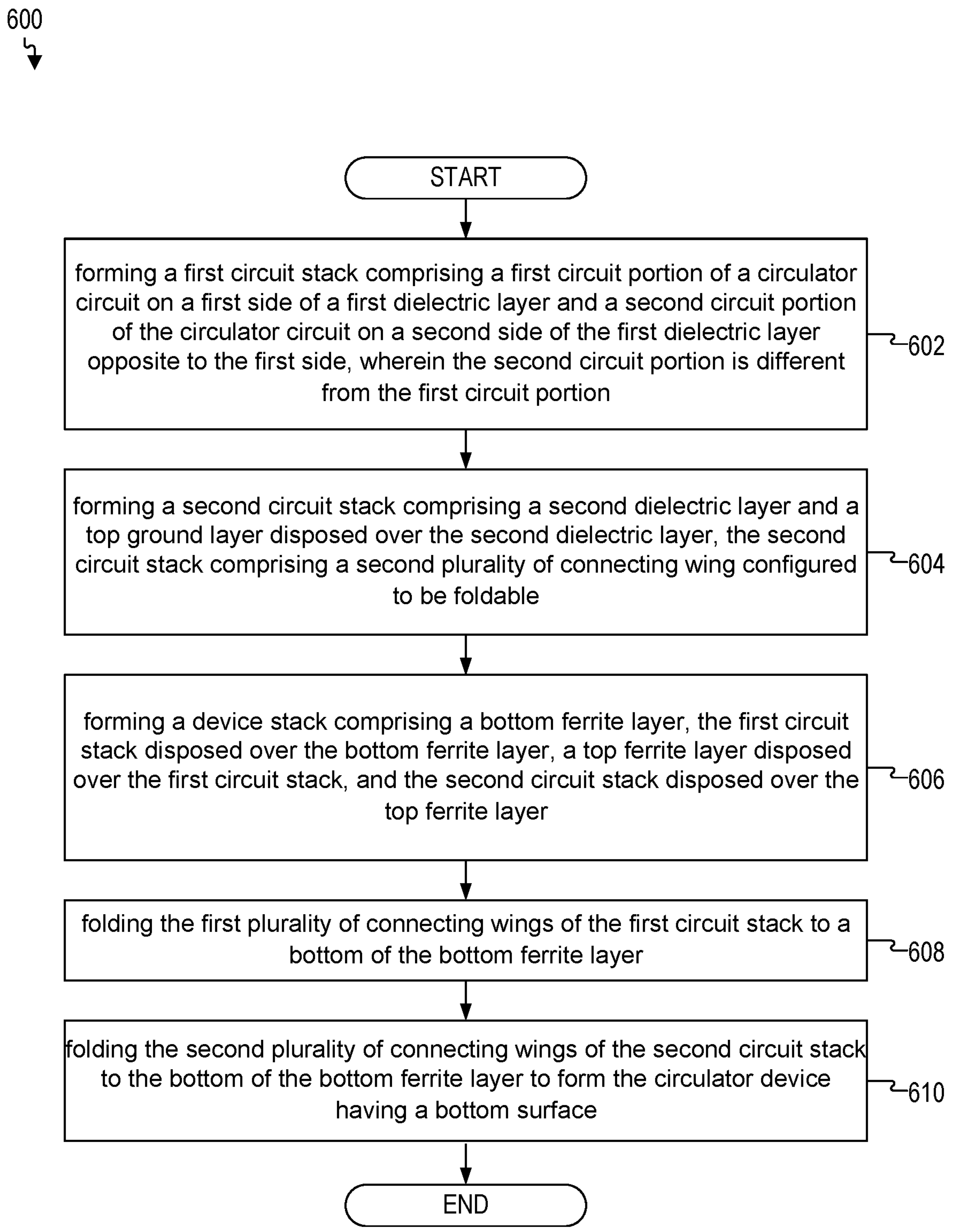
FIG. 6 is a flow chart illustrating the steps of manufacturing a circulator or circulator assembly according to one aspect of the disclosure.

FIG. 6 is a flow chart illustrating the steps for fabricating a circulator device according to one aspect of the disclosure. The circulator device includes example circulator device 100.

Method 600 for fabricating the disclosed circulator device includes forming a first circuit stack 101 comprising a first circuit portion 110 of a circulator circuit 107 on a first side of a first dielectric layer 106 and a second circuit portion 118 of the circulator circuit 107 on a second side of the first dielectric layer 106 opposite to the first side, wherein the second circuit portion 118 is different from the first circuit portion 110 at operation 602.

In some variations, forming the circulator circuit 107 may include using a pre-fabricated flexible PCB layer with copper foil on both sides and forming the elements of top coupling circuit 110 and bottom coupling circuit 118 using standard PCB fabrication methods. For example, main circuit 110 may be etched on the top side of the PCB layer or dielectric layer, and the bottom coupling circuit 118, such as tuning elements, may be etched on the backside of the dielectric layer.

In some variations, forming the circulator circuit 107 may include depositing a seed layer on a top and a bottom of the first dielectric layer 106 by sputtering to form top and bottom seeded surfaces. In some embodiments, the seed layer may be chromium, titanium, or tungsten, among others. In particular, chromium binds well to both the dielectric and copper.

In some variations, forming the circulator circuit 107 may also include plating a metal on the top and bottom seeded surfaces over the first dielectric layer 106 to form top and bottom plated layers.

The main circuit or conductor circuit 110 may be formed on the top side of the middle dielectric layer 106. Coupling circuit 118 may be formed on the backside of the middle dielectric layer 106. Ground 116 and mounting pads 128 are formed on the same dielectric layer 106 as the main circuit 110.

The resistive sheet may be added under the conductor. The resistive sheet can be in the form of commercially available copper foils with an embedded resistive sheet, such as Ohmega Ply™ or Ticer™, pre-fabricated onto one or both sides of a flexible PCB material and formed using standard PCB processes or the resistive element may be formed selectively onto a formed circuit by an additive process such as sputtering, screen printing or inkjet printing of resistive materials.

In some variations, the resistive element may be formed on a face of one or both of the ferrites 102 or 104 in an area facing the main circuit 110 or a bend piece of the main circuit 110, preferably the combination having a good thermal path and cost compromise for the application.

Method 600 also includes forming a second circuit stack 103 comprising a second dielectric layer 105 and a top ground layer 108 disposed over the second dielectric layer, the second circuit stack comprising a second plurality of connecting wing 114A-C configured to be foldable at operation 604.

In some variations, the top and middle dielectric layers 105 and 106 can be formed of, but not limited to, polymers such as a polyimide, PTFE, fiber-reinforced polymers, such as epoxy glass re-enforced material, or ceramic materials, among others.

In some variations, forming the top ground layer 108 on the top dielectric layer 105 may include plating a metal on the seeded surface over the second dielectric layer.

In some embodiments, the metal used for ground planes, the top and bottom coupling circuits, and mounting pads have high conductivity, such as copper, silver, gold, aluminum or tin, among others.

In some variations, a metal seed layer may include chrome and copper which may be sputtered on the first and second dielectric layers.

In some variations, the seeded dielectric layers may be copper plated. The circulator circuit may be formed from the plated copper.

Method 600 may also include forming a device stack comprising a bottom ferrite layer, the first circuit stack disposed over the bottom ferrite layer, a top ferrite layer disposed over the first circuit stack, and the second circuit stack disposed over the top ferrite layer at operation 606.

Method 600 may also include folding the first plurality of connecting wings of the first circuit stack to a bottom of the bottom ferrite layer at operation 608.

Method 600 may also include folding the second plurality of connecting wings of the second circuit stack to the bottom of the bottom ferrite layer to form the circulator device having a bottom surface at operation 610.

In alternative variations, the method may include 3D printing the circulator circuit 107 on both sides of the dielectric layer and 3D printing the vertical connection to the mounting surface.

In some variations, the middle dielectric layer 106 can be formed of the ceramic material while both the top and bottom coupling circuits are printed or sputtered. Then, a side metallization on the dielectric material and the ferrites may be used to connect the coupling circuits 110 and 118 to a mounting surface 304 under the bottom ferrite layer 104. It is understood that a selective plating process may be used to form patterns in metallization. For example, the middle dielectric layer 106 and the bottom ferrite layer 104 may be side metallized to provide signal paths for the circulator circuit to a mounting surface 304. The top and middle dielectric layers 105 and 106 and the top and bottom ferrite layers 102 and 104 may be side metallized to provide electrical paths for the top ground layer to a bottom ground layer at a bottom of the device.

A method for fabricating a circulator device may include forming a first circuit stack comprising a first circuit portion of a circulator circuit on a first side of a first dielectric layer and a second circuit portion of the circulator circuit on a second side of the first dielectric layer opposite to the first side, wherein the second circuit portion is different from the first circuit portion.

The method may also include forming a second circuit stack comprising a second dielectric layer and a top ground layer disposed over the second dielectric layer.

The method may also include plating a first edge portion of a bottom ferrite layer to provide signal paths from the first circuit portion and the second circuit portion to a mounting surface of the circulator device. The method may also include plating an edge portion of the top ferrite layer and a second edge portion of the bottom ferrite layer to provide an electrical path from the top ground layer or a middle ground layer to a bottom ground layer.

The method may further include forming a device stack comprising a bottom ferrite layer, the first circuit stack disposed over the bottom ferrite layer, a top ferrite layer disposed over the first circuit stack, and the second circuit stack disposed over the top ferrite layer.

Applications

The 5G mobile phone network works by way of a plurality of base stations, often arranged in cell towers or on buildings. A typical base station contains an array of transceiver modules or blocks arranged to work in a MIMO configuration to maximize performance and flexibility. A MIMO configuration may have many transceivers, such as 64 transceivers. Each transceiver includes a circulator to direct the amplified transmitting signal to the antenna and direct the received signal from the antenna to the receiver, while blocking the transmitting signal from entering the receiver, thus allowing for a full duplex operation.

The circulators may be either clockwise or counterclockwise, the direction is set by a statically applied magnetic bias. In a clockwise circulator, if a signal is applied to a port, then the signal will exit the next port in a clockwise direction while the next port in a counterclockwise direction is isolated, i.e., the next port sees no signal. And vice versa if the circulator is in a counterclockwise direction. The circulator is thus a non-reciprocal device with at least 3 ports. The circulators include a ferrite material, which, when magnetically biased, causes non-reciprocal operation.

The ferrite circulators are often used as a duplexer as in the example of the 5G base stations. The circulator may also be used to protect/isolate equipment. For instance, an amplifier applies a signal to one port, an antenna is connected to the following port in the direction of operation, and termination is connected to the last port, if in this configuration the antenna becomes damaged or disconnected, then the reflected power will go to the termination instead of back into the amplifier and thus protect the amplifier from overload. For this type of protective operation, the circulator may have a built-in termination and is then referred to as an isolator. The operation of circulators can be compared to a revolving door with three entrances and one mandatory rotating sense.

The circulator can be configured to operate at a reduced frequency. For example, at least one of the first circuit portion and the second circuit portion may include one or more shunt capacitors configured to tune the circulator to the reduced frequency of operation. The reduced frequency of operation may be in a range from 2300 MHz to 2700 MHZ.

In some variations, a method of using the circulator may include tuning one of the first circuit portion or the second circuit portion to a reduced operation frequency ranging from 2300 MHz to 2700 MHZ.

For example, typically existing circulators operate in a frequency around 4000 MHz. In contrast, various embodiments or aspects, the presently disclosed device is configured to operate in a reduced frequency around 2500 MHz without increasing the size of the circulator or the diameter of the ferrites.

Any ranges cited herein are inclusive. The terms "substantially" and "about" used throughout this specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Clause 1. A device comprising: a top ferrite layer; a bottom ferrite layer; a first circuit stack between the top ferrite layer and the bottom ferrite layer, wherein the first circuit stack comprises a first dielectric layer and a circulator circuit comprising a first circuit portion on a first side of the first dielectric layer and a second circuit portion on a second side of the first dielectric layer opposite the first side, wherein the first circuit portion is different from the second circuit portion; and a second circuit stack comprising a second dielectric layer and a top ground layer disposed over the second dielectric layer, wherein the second circuit stack is disposed over the top ferrite layer.

Clause 2. The device of clause 1, wherein the first circuit stack comprises a first plurality of connecting wings configured to be foldable, wherein the second circuit stack comprises a second plurality of connecting wings configured to be foldable.

Clause 3. The device of clause 2, wherein the first plurality of connecting wings is substantially pie shaped.

Clause 4. The device of clause 2, wherein the second plurality of connecting wings is substantially pie shaped.

Clause 5. The device of clause 2, wherein the first circuit stack is configured to be folded around the bottom ferrite layer to provide interconnect between the circulator circuit and a mounting surface of the device.

Clause 6. The device of clause 5, wherein the circulator circuit connects to the mounting surface by a first plurality of flex connections being connected between one of the first circuit portion or the second circuit portion comprising Y-junction conductors and the first plurality of connecting wings.

Clause 7. The device of clause 5, wherein the second plurality of connecting wings is configured to be folded around the bottom ferrite layer to connect to a bottom ground layer on the mounting surface.

Clause 8. The device of clause 7, wherein the top ground layer connects to the bottom ground layer by a second plurality of flex connections being connected to the second plurality of connecting wings.

Clause 9. The device of clause 2, wherein the first circuit stack comprises mounting pads and a middle ground layer over the first side of the first dielectric layer, wherein the mounting pads and a portion of the middle ground layer are electrically isolated and positioned on the first plurality of connecting wings.

Clause 10. The device of clause 9, wherein the device has a bottom surface comprising a first plurality of folded connecting wings alternately positioned with a second plurality of folded connecting wings, the bottom surface comprising the mounting pads and the portion of the middle ground layer.

Clause 11. The device of clause 1, further comprising a magnet over the top ferrite layer for providing magnetic bias.

Clause 12. The device of clause 1, wherein at least one of the first circuit portion and the second circuit portion comprises one or more shunt capacitors configured to tune the device to a reduced frequency of operation.

Clause 13. The device of clause 12, wherein the reduced frequency of operation is in a range from 2300 MHz to 2700 MHz.

Clause 14. The device of clause 1, further comprising three or more ports, wherein one or more ports are coupled to the first circuit portion and the second circuit portion.

Clause 15. The device of clause 14, wherein at least one of the first circuit portion and the second circuit portion comprises a resistive element configured to terminate at least one of the three or more ports of the device to form an isolator.

Clause 16. The device of clause 1, wherein the first dielectric layer and the bottom ferrite layer are side metallized to provide signal paths for the circulator circuit to a mounting surface.

Clause 17. The device of clause 1, wherein the first and second dielectric layers and the top and bottom ferrite layers are side metallized to provide electrical paths for the top ground layer to a bottom ground layer at a bottom of the device.

Clause 18. A method for fabricating a circulator device, the method comprising: forming a first circuit stack comprising a first circuit portion of a circulator circuit on a first side of a first dielectric layer and a second circuit portion of the circulator circuit on a second side of the first dielectric layer opposite to the first side, wherein the second circuit portion is different from the first circuit portion, the first circuit stack comprising a first plurality of connecting wing configured to be foldable; forming a second circuit stack comprising a second dielectric layer and a top ground layer disposed over the second dielectric layer, the second circuit stack comprising a second plurality of connecting wing configured to be foldable; forming a device stack comprising a bottom ferrite layer, the first circuit stack disposed over the bottom ferrite layer, a top ferrite layer disposed over the first circuit stack, and the second circuit stack disposed over the top ferrite layer; folding the first plurality of connecting wings of the first circuit stack to a bottom of the bottom ferrite layer; and folding the second plurality of connecting wings of the second circuit stack to the bottom of the bottom ferrite layer to form the circulator device having a bottom surface.

Clause 19. The method of clause 18, further comprising attaching a magnet to the top ground layer by adhesive.

Clause 20. The method of clause 18, wherein the first and second dielectric layers comprise one of polymer, fiber-reinforced polymer, or ceramic material.

Clause 21. The method of clause 18, wherein one of the first circuit portion and the second circuit portion comprises Y-junction conductors, wherein the first circuit stack comprises a middle ground layer and mounting pads on a same side as the at least one of the first circuit portion and the second circuit portion, wherein another one of the first circuit portion and the second circuit portion comprises tuning elements comprising a shunt capacitor configured to tune the circulator device to a reduced frequency.

Clause 22. The method of clause 21, wherein the top and middle ground layers and the circulator circuit comprise a metal selected from one or more of gold, silver, copper, aluminum, or tin.

Clause 23. The method of clause 21, wherein the bottom surface comprises a first plurality of folded connecting wings alternately positioned with a second plurality of folded connecting wings, the bottom surface comprising the mounting pads and the portion of the middle ground layer.

Clause 24. A method for fabricating a circulator device, the method comprising: forming a first circuit stack comprising a first circuit portion of a circulator circuit on a first side of a first dielectric layer and a second circuit portion of the circulator circuit on a second side of the first dielectric layer opposite to the first side, wherein the second circuit portion is different from the first circuit portion; forming a second circuit stack comprising a second dielectric layer and a top ground layer disposed over the second dielectric layer; plating a first edge portion of a bottom ferrite layer to provide signal paths from the first circuit portion and the second circuit portion to a mounting surface of the circulator device; and forming a device stack comprising a bottom ferrite layer, the first circuit stack disposed over the bottom ferrite layer, a top ferrite layer disposed over the first circuit stack, and the second circuit stack disposed over the top ferrite layer.

Clause 25. The method of clause 24, further comprising plating an edge portion of the top ferrite layer and a second edge portion of the bottom ferrite layer to provide an electrical path from the top ground layer or a middle ground layer to a bottom ground layer.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system which, as a matter of language, might be said to fall therebetween.

What is claimed is:

1. A device comprising:

a top ferrite layer;

a bottom ferrite layer;

a first circuit stack between the top ferrite layer and the bottom ferrite layer, wherein the first circuit stack comprises a first dielectric layer and a circulator circuit comprising a first circuit portion on a first side of the first dielectric layer and a second circuit portion on a second side of the first dielectric layer opposite the first side, wherein the first circuit portion is different from the second circuit portion; and a second circuit stack comprising a second dielectric layer and a top ground layer disposed over the second dielectric layer, wherein the second circuit stack is disposed over the top ferrite layer, wherein the first circuit stack comprises a first plurality of connecting wings configured to be foldable, wherein the second circuit stack comprises a second plurality of connecting wings configured to be foldable.

2. The device of claim 1, wherein the first plurality of connecting wings is substantially pie shaped.

3. The device of claim 1, wherein the second plurality of connecting wings is substantially pie shaped.

4. The device of claim 1, wherein the first circuit stack is configured to be folded around the bottom ferrite layer to provide interconnect between the circulator circuit and a mounting surface of the device.

5. The device of claim 4, wherein the circulator circuit connects to the mounting surface by a first plurality of flex connections being connected between one of the first circuit portion or the second circuit portion comprising Y-junction conductors and the first plurality of connecting wings.

6. The device of claim 4, wherein the second plurality of connecting wings is configured to be folded around the bottom ferrite layer to connect to a bottom ground layer on the mounting surface.

7. The device of claim 6, wherein the top ground layer connects to the bottom ground layer by a second plurality of flex connections being connected to the second plurality of connecting wings.

8. The device of claim 1, wherein the first circuit stack comprises mounting pads and a middle ground layer over the first side of the first dielectric layer, wherein the mounting pads and a portion of the middle ground layer are electrically isolated and positioned on the first plurality of connecting wings.

9. The device of claim 8, wherein the device has a bottom surface comprising the first plurality of folded connecting wings alternately positioned with the second plurality of folded connecting wings, the bottom surface comprising the mounting pads and the portion of the middle ground layer.

10. The device of claim 1, further comprising a magnet over the top ferrite layer for providing magnetic bias.

11. The device of claim 1, wherein at least one of the first circuit portion or the second circuit portion comprises Y-junction conductors, wherein at least one of the second circuit portion or the first circuit portion comprises one or more shunt capacitors coupled to the Y-junction conductors and configured to tune the device to a reduced frequency of operation.

12. The device of claim 11, wherein the reduced frequency of operation is in a range from 2300 MHz to 2700 MHZ.

13. The device of claim 1, further comprising three or more ports, wherein one or more ports are coupled to the first circuit portion and the second circuit portion.

14. The device of claim 13, wherein at least one of the first circuit portion and the second circuit portion comprises a resistive element configured to terminate at least one of the three or more ports of the device to form an isolator, wherein the termination is built inside the circulator device on either the top or bottom sides of the first dielectric layer.

15. The device of claim 1, wherein the first dielectric layer and the bottom ferrite layer are side metallized to provide signal paths for the circulator circuit to a mounting surface.

16. The device of claim 1, wherein the first and second dielectric layers and the top and bottom ferrite layers are side metallized to provide electrical paths for the top ground layer to a bottom ground layer at a bottom of the device.

17. A device comprising:

a top ferrite layer;

a bottom ferrite layer;

a first circuit stack between the top ferrite layer and the bottom ferrite layer, wherein the first circuit stack comprises a first dielectric layer and a circulator circuit comprising a first circuit portion on a first side of the first dielectric layer and a second circuit portion on a second side of the first dielectric layer opposite the first side, wherein the first circuit portion is different from the second circuit portion; and a second circuit stack comprising a second dielectric layer and a top ground layer disposed over the second dielectric layer, wherein the second circuit stack is disposed over the top ferrite layer, wherein the first dielectric layer and the bottom ferrite layer are side metallized to provide signal paths for the circulator circuit to a mounting surface.

18. A device comprising:

a top ferrite layer;

a bottom ferrite layer;

a first circuit stack between the top ferrite layer and the bottom ferrite layer, wherein the first circuit stack comprises a first dielectric layer and a circulator circuit comprising a first circuit portion on a first side of the first dielectric layer and a second circuit portion on a second side of the first dielectric layer opposite the first side, wherein the first circuit portion is different from the second circuit portion; and a second circuit stack comprising a second dielectric layer and a top ground layer disposed over the second dielectric layer, wherein the second circuit stack is disposed over the top ferrite layer, wherein the first and second dielectric layers and the top and bottom ferrite layers are side metallized to provide electrical paths for the top ground layer to a bottom ground layer at a bottom of the device.

19. A method for fabricating a circulator device, the method comprising:

forming a first circuit stack comprising a first circuit portion of a circulator circuit on a first side of a first dielectric layer and a second circuit portion of the circulator circuit on a second side of the first dielectric layer opposite to the first side, wherein the second circuit portion is different from the first circuit portion, the first circuit stack comprising a first plurality of connecting wings configured to be foldable;

forming a second circuit stack comprising a second dielectric layer and a top ground layer disposed over the second dielectric layer, the second circuit stack comprising a second plurality of connecting wings configured to be foldable;

forming a device stack comprising a bottom ferrite layer, the first circuit stack disposed over the bottom ferrite layer, a top ferrite layer disposed over the first circuit stack, and the second circuit stack disposed over the top ferrite layer;

folding the first plurality of connecting wings of the first circuit stack to a bottom of the bottom ferrite layer; and folding the second plurality of connecting wings of the second circuit stack to the bottom of the bottom ferrite layer to form the circulator device having a bottom surface.

20. The method of claim 19, further comprising attaching a magnet to the top ground layer by adhesive.

21. The method of claim 19, wherein the first and second dielectric layers comprise one of polymer, fiber-reinforced polymer, or ceramic material.

22. The method of claim 19, wherein one of the first circuit portion and the second circuit portion comprises Y-junction conductors, wherein the first circuit stack comprises a middle ground layer and mounting pads on a same side as the one of the first circuit portion and the second circuit portion, wherein another one of the first circuit portion and the second circuit portion comprises tuning elements comprising a shunt capacitor configured to tune the circulator device to a reduced frequency.

23. The method of claim 22, wherein each of the top ground layer, the middle ground layer, and the circulator circuit comprises a metal selected from one or more of gold, silver, copper, aluminum, or tin.

24. The method of claim 22, wherein the bottom surface comprises the first plurality of folded connecting wings alternately positioned with the second plurality of folded connecting wings, the bottom surface comprising the mounting pads and the portion of the middle ground layer.

25. A method for fabricating a circulator device, the method comprising:

forming a first circuit stack comprising a first circuit portion of a circulator circuit on a first side of a first dielectric layer and a second circuit portion of the circulator circuit on a second side of the first dielectric layer opposite to the first side, wherein the second circuit portion is different from the first circuit portion;

forming a second circuit stack comprising a second dielectric layer and a top ground layer disposed over the second dielectric layer;

plating a first edge portion of a bottom ferrite layer to provide signal paths from the first circuit portion and the second circuit portion to a mounting surface of the circulator device; and forming a device stack comprising the bottom ferrite layer, the first circuit stack disposed over the bottom ferrite layer, a top ferrite layer disposed over the first circuit stack, and the second circuit stack disposed over the top ferrite layer.

26. The method of claim 25, further comprising plating an edge portion of the top ferrite layer and a second edge portion of the bottom ferrite layer to provide an electrical path from the top ground layer or a middle ground layer to a bottom ground layer.

* * * * *